(12) United States Patent
Son et al.

(10) Patent No.: US 11,099,106 B2
(45) Date of Patent: *Aug. 24, 2021

(54) DIAGNOSIS CONTROL METHOD OF AIR CONDITIONER

(71) Applicant: Samsung Electronics Co., Ltd., Suwon-si (KR)

(72) Inventors: Kil Soo Son, Pusan (KR); Jong Kweon Ha, Suwon-si (KR); Kwang Sik Han, Suwon-si (KR); Young Jin Kim, Suwon-si (KR); Beom Seok Seo, Suwon-si (KR); Byoung Ok Ahn, Suwon-si (KR); Hong Seok Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,972

(22) Filed: May 31, 2019

(65) Prior Publication Data

US 2019/0285516 A1    Sep. 19, 2019

Related U.S. Application Data

(63) Continuation of application No. 15/817,795, filed on Nov. 20, 2017, now Pat. No. 10,837,872, which is a (Continued)

(30) Foreign Application Priority Data

Jul. 3, 2012   (KR) .................. 10-2012-0072310
Jun. 10, 2013   (KR) .................. 10-2013-0066054

(51) Int. Cl.
*G01M 99/00*   (2011.01)
*F24F 11/30*   (2018.01)
(Continued)

(52) U.S. Cl.
CPC ........... *G01M 99/005* (2013.01); *F24F 11/30* (2018.01); *F24F 11/32* (2018.01); *F24F 11/52* (2018.01); *F24F 2110/00* (2018.01)

(58) Field of Classification Search
CPC ..................................... F24F 1/06; F24F 1/30
See application file for complete search history.

(56) References Cited

U.S. PATENT DOCUMENTS 4,386,502 A * 6/1983 Umezu .................... G01K 1/16
                                                          62/129
5,974,813 A    11/1999 Jeong
(Continued)

FOREIGN PATENT DOCUMENTS

CN    1283778 A    2/2001
CN    1928448 A    3/2007
(Continued)

OTHER PUBLICATIONS

Korean Office Action dated Oct. 21, 2019 in Korean Patent Application No. 10-2013-0066054.
(Continued)

*Primary Examiner* — Lam S Nguyen
(74) *Attorney, Agent, or Firm* — Staas & Halsey LLP

(57) ABSTRACT

A diagnosis control method of an air conditioner is provided to clearly inform a user of an air conditioner installation error. The diagnosis control method includes receiving a test run command or a self-diagnosis command for diagnosis of the air conditioner, performing a first test run to diagnose an assembly state of the air conditioner, performing a second test run to diagnose pipe connection of the air conditioner and an amount of refrigerant in the air conditioner, performing a determination including diagnosing a state of the air conditioner based on operation results of the first test run and the second test run, and displaying the diagnosis result
(Continued)

through a display device provided at an indoor unit of the air conditioner.

19 Claims, 10 Drawing Sheets

Related U.S. Application Data continuation of application No. 13/933,433, filed on Jul. 2, 2013, now Pat. No. 9,851,280.

(51) Int. Cl.
*F24F 11/32* (2018.01)
*F24F 110/00* (2018.01)
*F24F 11/52* (2018.01)

(56) References Cited

U.S. PATENT DOCUMENTS

| | | | |
|---|---|---|---|
| 6,279,332 | B1 | 8/2001 | Yeo |
| 6,434,959 | B2* | 8/2002 | Kobayashi ............ F25B 9/006 62/114 |
| 2004/0134206 | A1* | 7/2004 | Lee .................... F25B 13/00 62/157 |
| 2005/0204756 | A1 | 9/2005 | Dobmeier |
| 2011/0113800 | A1* | 5/2011 | Sekiya ................. B60L 1/003 62/151 |

FOREIGN PATENT DOCUMENTS

| | | |
|---|---|---|
| CN | 101737856 A | 6/2010 |
| CN | 102519119 A | 6/2012 |
| EP | 1666805 | 6/2006 |
| EP | 1876403 | 1/2008 |
| JP | 7-26636 | 5/1995 |
| JP | 3071135 | 5/2000 |
| JP | 2001165491 A | 6/2001 |
| JP | 3211412 | 7/2001 |
| JP | 2002-221348 | 8/2002 |
| JP | 3458984 | 8/2003 |
| JP | 2004-85043 | 3/2004 |
| JP | 2005-49001 | 2/2005 |
| JP | 2007-263539 | 10/2007 |
| KR | 10-2000-0073050 | 12/2000 |
| KR | 10-2007-0017269 | 2/2007 |
| KR | 10-2007-0120546 | 12/2007 |
| KR | 10-2008-0020845 | 3/2008 |
| KR | 102010-0058106 | 6/2010 |
| KR | 10-2010-0088375 | 8/2010 |
| WO | 02/42100 | 5/2002 |

OTHER PUBLICATIONS

U.S. Notice of Allowance dated Mar. 18, 2020 in U.S. Appl. No. 15/817,795.
U.S. Notice of Allowance dated Jul. 30, 2020 in U.S. Appl. No. 15/817,795.
European Communication dated May 8, 2020 in European Patent Application No. 13174257.9.
Korean Office Action dated Apr. 16, 2020 in Korean Patent Application No. 10-2013-0066054.
Chinese Notification of Due Registration dated Jun. 2, 2017 in related Chinese Patent Application No. 201310277236.5.
Australian Notice of Acceptance dated May 19, 2017 in related Australian Patent Application No. 2013206635.
Australian Examination Report dated Jan. 16, 2017 in corresponding Australian Application No. 2013206635.
Chinese First Office Action dated Dec. 22, 2016 in corresponding Chinese Application No. 201310277236.5.
U.S. Notice of Allowance dated Aug. 18, 2017 in U.S. Appl. No. 13/933,433.
U.S. Office Action dated Jun. 1, 2017 in U.S. Appl. No. 13/933,433.
U.S. Office Action dated Nov. 14, 2016 in U.S. Appl. No. 13/933,433.
U.S. Restriction Requirement dated Jun. 21, 2016 in U.S. Appl. No. 13/933,433.
Extended European Search Report dated Nov. 29, 2017 in European Patent Application No. 13174257.9.
U.S. Appl. No. 15/817,795, filed Nov. 20, 2017, Kil Soo Son, et al., Samsung Electronics Co., Ltd.
U.S. Appl. No. 13/933,433 (now U.S. Pat. No. 9,851,280), filed Jul. 2, 2013, Kil Soo Son, et al., Samsung Electronics Co., Ltd.
European Communication under Rule 71(3) dated Jun. 19, 2019 in European Patent Application No. 13174257.9.
U.S. Office Action dated Jun. 10, 2019 in U.S. Appl. No. 15/817,795.
Korean Office Action dated Jul. 21, 2020 in Korean Patent Application No. 10-2013-0066054.
European Office Action dated Jul. 9, 2020 in European Patent Application No. 20168842.1.
Extended European Search Report dated Nov. 20, 2020 in European Patent Application No. 20168842.1.
Korean Office Action dated Mar. 26, 2021 in Korean Patent Application No. 10-2021-0001972.

* cited by examiner

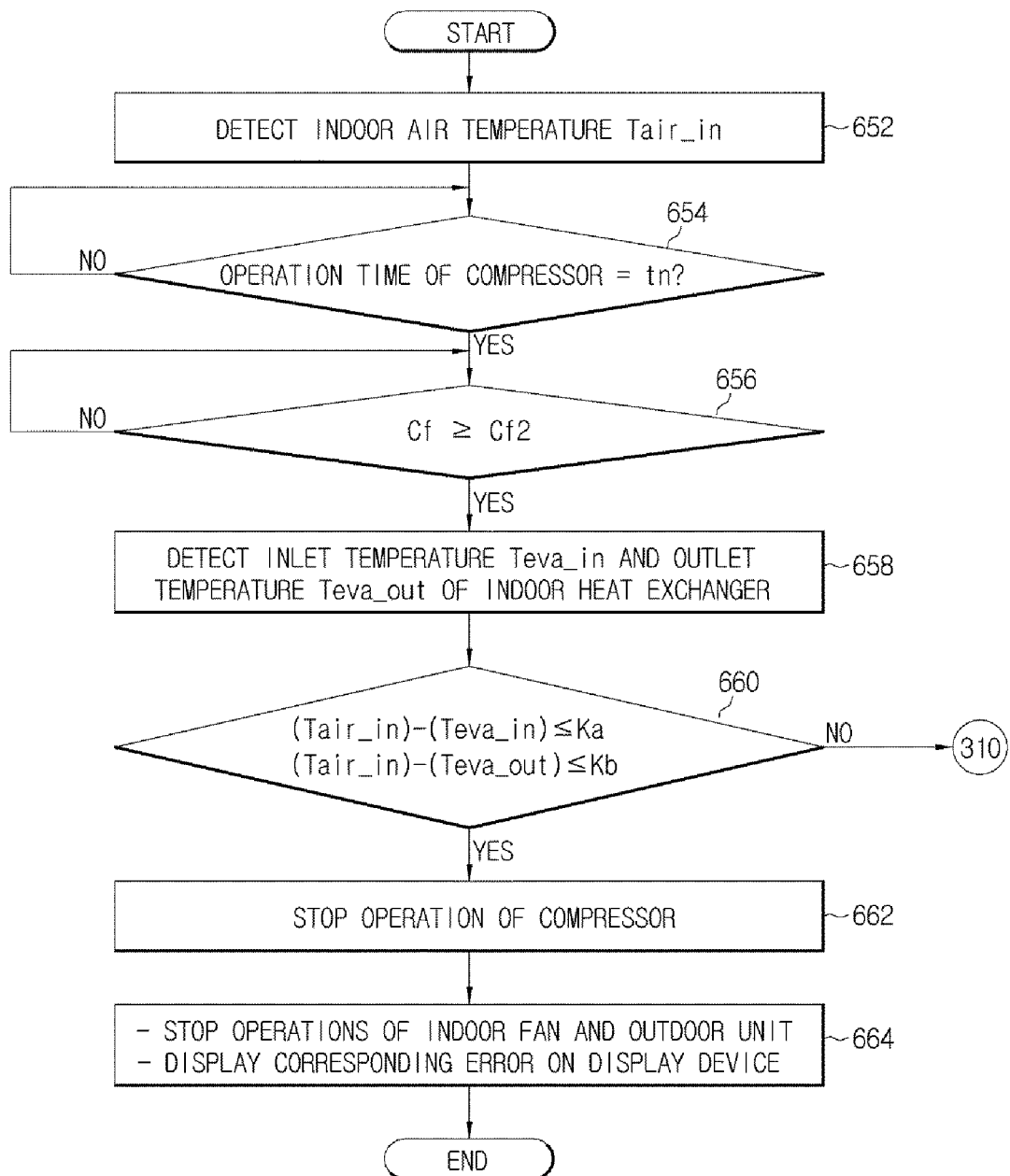

DIAGNOSIS CONTROL METHOD OF AIR CONDITIONER

CROSS-REFERENCE TO RELATED APPLICATIONS

This application is a continuation of U.S. patent application Ser. No. 15/817,795 filed on Nov. 20, 2017, which is a continuation of U.S. patent application Ser. No. 13/933,433 filed on Jul. 2, 2013, which claims the priority benefit of Korean Patent Application No. 10-2012-0072310 filed on Jul. 3, 2012 in the Korean Intellectual Property Office and Korean Patent Application No. 10-2013-0066054 filed on Jun. 10, 2013 in the Korean Intellectual Property Office, the disclosures of which are incorporated herein by reference.

BACKGROUND

1. Field

Embodiments relate to a diagnosis control method of an air conditioner that diagnoses whether the air conditioner has been normally installed and is normally operated.

2. Description of the Related Art

A conventional multi type air conditioner includes two or more indoor units. Pipes connected between an outdoor unit and the indoor units are inspected to diagnose the air conditioner.

In this case, it is detected whether the air conditioner has not been normally installed only when a refrigeration cycle is completely constrained, for example when refrigerant fully leaks from the air conditioner or when a service valve is fully turned off. As a result, diagnosis of the air conditioner is restricted.

SUMMARY

In an aspect of one or more embodiments, there is provided a diagnosis control method of an air conditioner that clearly informs a user or an installation engineer of an installation error which may occur during installation of the air conditioner through diagnosis based on test run such that the user or the installation engineer installs the air conditioner and takes follow-up measures with objectivity and accuracy.

In an aspect of one or more embodiments, there is provided a diagnosis control method of an air conditioner which includes receiving a test run command or a self-diagnosis command for diagnosis of the air conditioner, performing a first test run to diagnose an assembly state of the air conditioner, performing a second test run to diagnose pipe connection of the air conditioner and an amount of refrigerant in the air conditioner, and performing determination including diagnosing a state of the air conditioner based on operation results of the first test run and the second test run and displaying the diagnosis result through a display device provided at an indoor unit of the air conditioner.

The performing the first test run may include diagnosing a communication state and a component assembly state of the air conditioner.

The performing the second test run may include determining a high-pressure clogging error and a refrigerant shortage error of the air conditioner.

The performing the second test run may further include determining, if a difference (Teva_in)−(Teva_in+1) between an inlet temperature (Teva_in) of an indoor heat exchanger of an indoor unit before a compressor of an outdoor unit is operated and an inlet temperature (Teva_in+1) of the indoor heat exchanger of the indoor unit after the compressor of the outdoor unit is operated is less than a predetermined reference value, that a pipe connection error has occurred between the outdoor unit and the indoor unit.

The diagnosis control method may further include determining, if the difference (Teva_in)−(Teva_in+1) between the inlet temperature (Teva_in) of the indoor heat exchanger before the compressor is operated and an inlet temperature (Teva_in+1) of the indoor heat exchanger after the compressor is operated is equal to or greater than the predetermined reference value and a difference (Teva_out)−(Teva_in) between the inlet temperature (Teva_in) and an outlet temperature (Teva_out) of the indoor heat exchanger is greater than a reference degree of superheat, that the refrigerant shortage error has occurred.

The performing the second test run may further include determining, if a difference (Tair_in)−(Teva_in) between an indoor air temperature (Tair_in) and an inlet temperature (Teva_in) of an indoor heat exchanger is equal to or less than a predetermined reference value (Ka) and a difference (Tair_in)−(Teva_out) between the indoor air temperature (Tair_in) and an outlet temperature (Teva_out) of the indoor heat exchanger is equal to or less than another predetermined reference value (Kb), that the high-pressure clogging error has occurred in an outdoor unit.

Conditions to determine the refrigerant shortage error in the second test run may include a first determination condition to determine, if the inlet temperature (Teva_in) of the indoor heat exchanger is equal to or less than a predetermined reference evaporation temperature ($\gamma$), that the refrigerant shortage error has occurred, a second determination condition to determine, if a difference (Teva_mid)−(Teva_in) between a middle temperature (Teva_mid) of the indoor heat exchanger and the inlet temperature (Teva_in) of the indoor heat exchanger is equal to or greater than a predetermined reference degree of evaporator superheat ($\delta$), that the refrigerant shortage error has occurred, and a third determination condition to determine, if a difference (Tdis)−(Tcond) between a discharge temperature (Tdis) of a compressor and an outlet temperature (Tcond) of an outdoor heat exchanger is equal to or greater than a predetermined degree of discharged superheat ($\varepsilon$), that the refrigerant shortage error has occurred.

The diagnosis control method may further include detecting, if an operation time of the compressor exceeds a predetermined time, the indoor air temperature (Tair_in), an outdoor air temperature (Tair_out), the inlet temperature (Teva_in) of the indoor heat exchanger, the middle temperature (Teva_mid) of the indoor heat exchanger, the outlet temperature (Tcond) of the outdoor heat exchanger, and the discharge temperature (Tdis) of the compressor.

The diagnosis control method may further include determining, if at least two of the first, second, and third determination conditions are satisfied, that the refrigerant shortage error has occurred.

The predetermined reference evaporation temperature ($\gamma$) of the first determination condition may be a value defined by $\gamma=(Tair\_out-35)\times 0.01\times C1+(Tair\_in-27)\times 0.01\times C2+C3$, where Tair_out is an outdoor air temperature, Tair_in is an indoor air temperature, and C1, C2, and C3 are constants.

The diagnosis control method may further include changing an operation frequency of a compressor so as to correspond to the number of indoor units test running during operation of the compressor.

The diagnosis control method may further include displaying progress of the first test run and the second test run through the display device.

The diagnosis control method may further include displaying progress of the first test run and the second test run in percentage.

The diagnosis control method may further include announcing progress and completion time of the first test run and the second test run using a voice.

The diagnosis control method may further include dividing the first test run and the second test run into a plurality of processes and displaying progress of the first test run and the second test run using one of the processes.

The display device may include a plurality of light emitting devices and the diagnosis control method may further include displaying progress of the first test run and the second test run by turning on the light emitting devices.

The diagnosis control method may further include displaying, in a self-diagnosis mode performed by the self-diagnosis command, a message indicating the self-diagnosis result through the display device.

The performing the first test run may include operating an indoor fan provided in an indoor unit of the air conditioner to saturate a temperature detector provided in the indoor unit.

The diagnosis control method may further include preventing a locked state of the air conditioner from being released such that the operation of the air conditioner is restricted in a case in which test run of the air conditioner has not been performed.

The diagnosis control method may further include resuming the test run if an error occurs during test run of the air conditioner and preventing the locked state of the air conditioner from being released such that the use of the air conditioner is restricted if the test run of the air conditioner is not normally completed.

The diagnosis control method may further include releasing a locked state of the air conditioner even when test run of the air conditioner is not normally completed in a self-diagnosis mode performed by the self-diagnosis command.

The diagnosis control method may further include transmitting setting/installation information to a remote server through a network module to store the setting/installation information in a database if a test run mode performed by the test run command or a self-diagnosis mode performed by the self-diagnosis command is completed.

The diagnosis control method may further include providing, if occurrence of an error is detected in the test run mode or the self-diagnosis mode, a method of resolving the error of the air conditioner and component information necessary to resolve the error through a mobile terminal to provide guidelines to resolve the error.

The diagnosis control method may further include allowing a user to have thorough knowledge of the component information necessary to resolve the error though provision of the component information when the error occurs.

In an aspect of one or more embodiments, there is provided a diagnosis control method of an air conditioner including receiving a test run command for diagnosis of the air conditioner; performing a first test run to diagnose an assembly state of the air conditioner; performing a second test run to diagnose pipe connection of the air conditioner and an amount of refrigerant in the air conditioner; diagnosing a state of the air conditioner based on operation results of the first test run and the second test run; and displaying the diagnosis result through a display device provided at an indoor unit of the air conditioner.

In an aspect of one or more embodiments, there is provided a diagnosis control method of an air conditioner including receiving a self-diagnosis command for diagnosis of the air conditioner; performing a first test run to diagnose an assembly state of the air conditioner; performing a second test run to diagnose pipe connection of the air conditioner and an amount of refrigerant in the air conditioner; diagnosing a state of the air conditioner based on operation results of the first test run and the second test run; and displaying the diagnosis result through a display device provided at an indoor unit of the air conditioner.

BRIEF DESCRIPTION OF THE DRAWINGS

These and/or other aspects will become apparent and more readily appreciated from the following description of embodiments, taken in conjunction with the accompanying drawings of which:

FIG. 6B is a flowchart showing an embodiment of the first determination process of the diagnosis control method (test run mode) shown in FIG. 3A;

DETAILED DESCRIPTION

Figure 1:
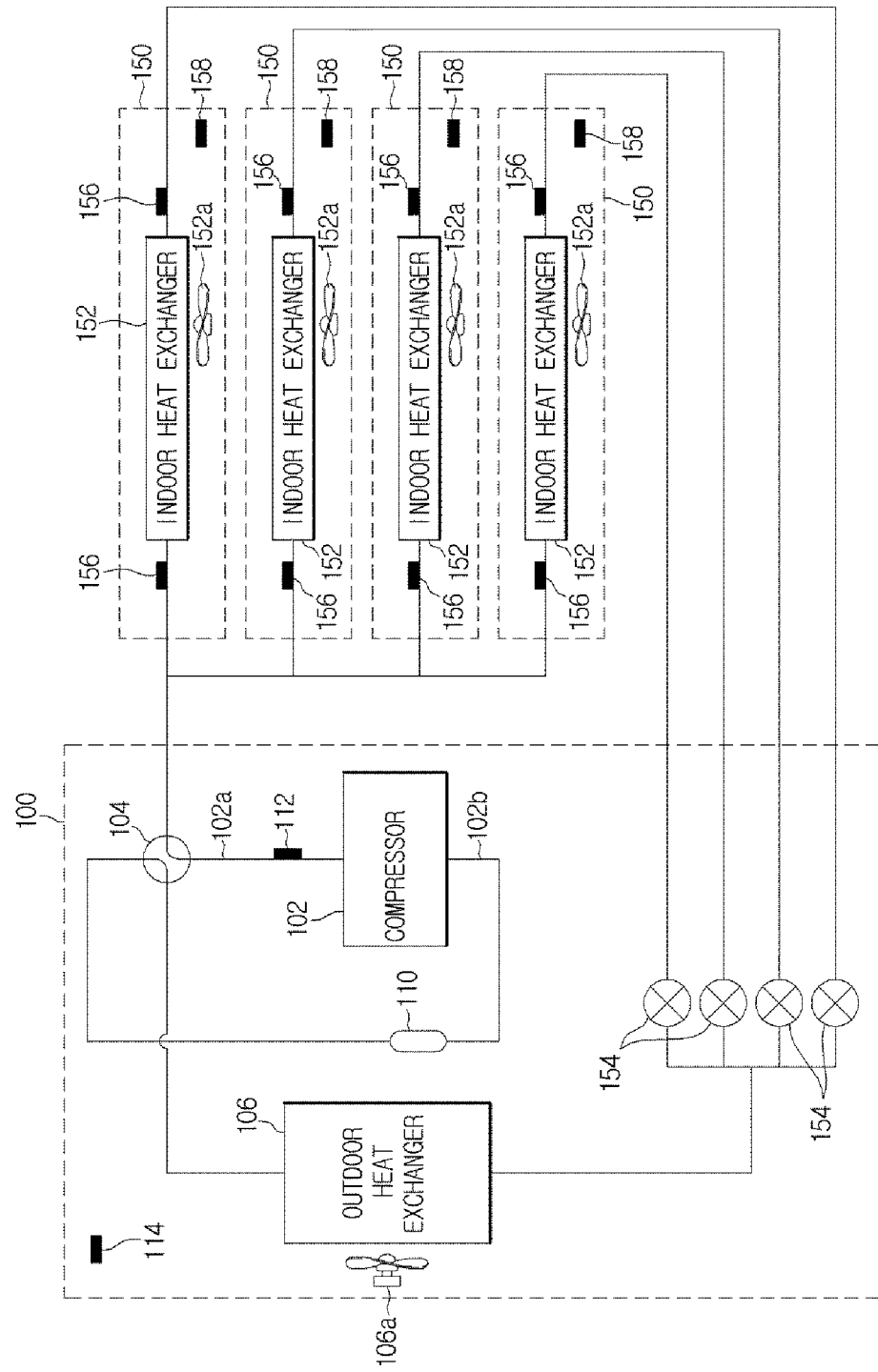
FIG. 1 is a view showing a refrigeration cycle of an air conditioner according to an embodiment.

Reference will now be made in detail to embodiments, examples of which are illustrated in the accompanying drawings, wherein like reference numerals refer to like elements throughout.

FIG. 1 is a view showing a refrigeration cycle of an air conditioner according to an embodiment. As shown in FIG. 1, the air conditioner may include at least one outdoor unit 100 and at least one indoor unit 150. A plurality of indoor units 150 may be connected to one outdoor unit 100.

The outdoor unit 100 includes a compressor 102, a four-way valve 104, an outdoor heat exchanger 106, an electronic expansion valve 154, and an accumulator 110. The four-way valve 104 is connected to a discharge side 102a of the compressor 102. The four-way valve 104 is controlled such that refrigerant discharged from the compressor 102 flows to one side of the outdoor heat exchanger 106 during a cooling operation and such that the refrigerant discharged from the compressor 102 flows to one side of the indoor unit 150 during a heating operation. The other side of the outdoor heat exchanger 106 is connected to the indoor unit 150. An outdoor fan 106a is installed adjacent to the outdoor heat exchanger 106. The accumulator 110 is disposed between a suction side 102b of the compressor 102 and the four-way valve 104. A compressor discharge temperature detector 112 is installed on a refrigerant pipe at the discharge side of the compressor 102. An outdoor temperature detector 114 to detect outdoor temperature is installed at a portion of the outdoor unit 100. The compressor 102 is a variable capacity compressor. An operation frequency of the compressor 102 is changed so as to correspond to capabilities required by the indoor unit 150, whereby capacity of the compressor 102 is varied.

In FIG. 1, a plurality of indoor units 150 is shown. Some of the indoor units 150 may be stand type indoor units and some of the indoor units 150 may be wall-mount type indoor units. Refrigeration cycle structures of the indoor units 150 are basically the same. That is, an indoor heat exchanger 152 is provided at each indoor unit 150. An indoor fan 152a is installed adjacent to the indoor heat exchanger 152. In addition, indoor heat exchanger temperature detectors 156 to detect inlet temperature and middle temperature and outlet temperature of the indoor heat exchanger 152 are installed on refrigerant pipes at opposite sides (inlet and outlet) of the indoor heat exchanger 152. Alternatively, only inlet temperature and middle temperature of the indoor heat exchanger 152 may be detected or only inlet temperature of the indoor heat exchanger 152 may be detected. In addition, an indoor temperature detector 158 to detect indoor temperature is installed at a portion of the indoor unit 150.

Figure 2:
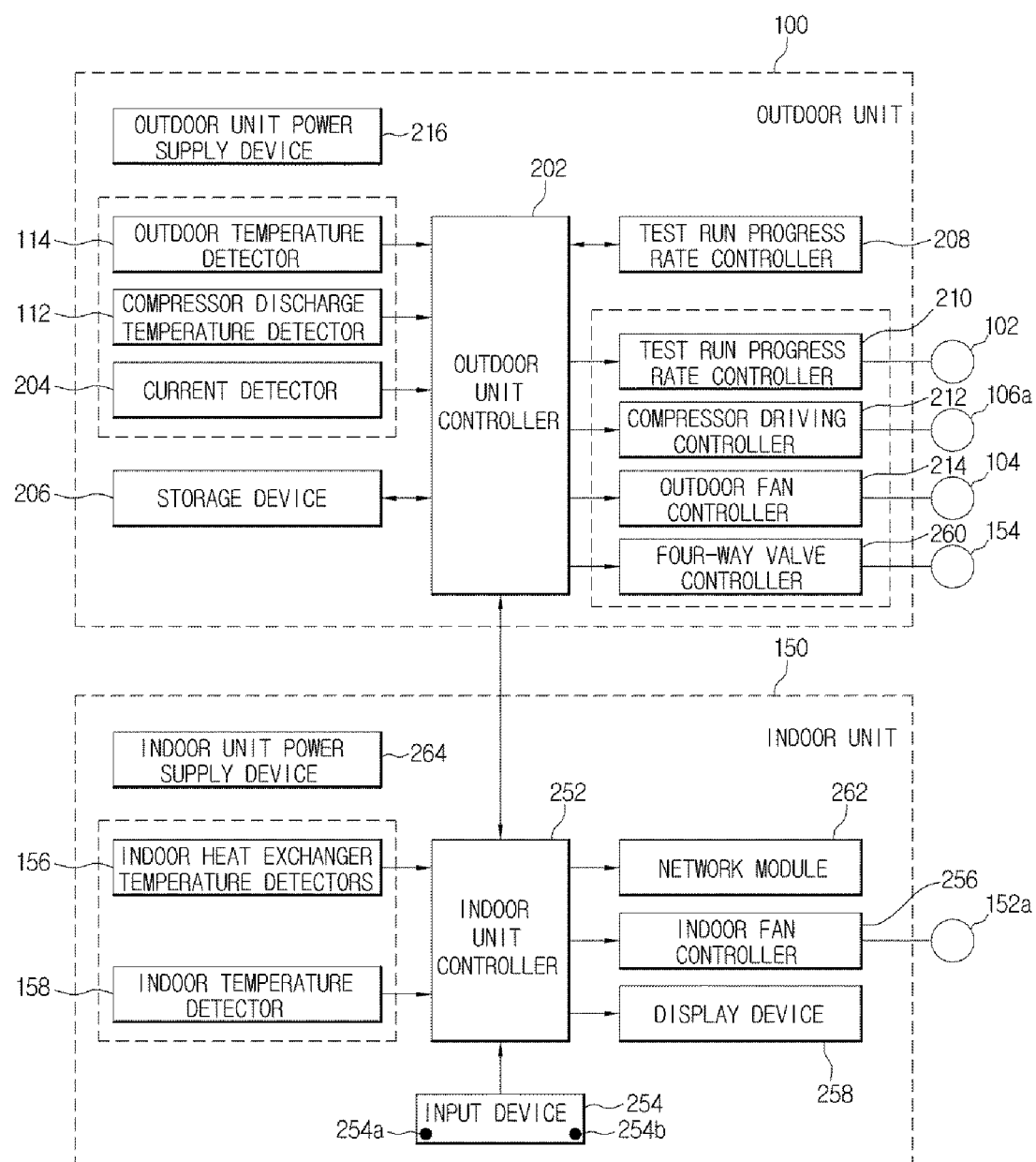
FIG. 2 is a view showing a control system of the air conditioner shown in FIG. 1.

FIG. 2 is a view showing a control system of the air conditioner shown in FIG. 1. In the outdoor unit 100, the outdoor temperature detector 114, the compressor discharge temperature detector 112, a current detector 204, a storage device 206, a test run progress rate controller 208, a compressor driving controller 210, an outdoor fan controller 212, a four-way valve controller 214, and an electronic expansion valve controller 260 are electrically connected to an outdoor unit controller 202 in a communicable fashion. In addition, an outdoor unit power supply device 216 to supply power to the outdoor unit 100 is provided at the outdoor unit 100. The outdoor temperature detector 114 and the compressor discharge temperature detector 112 were previously described with reference to FIG. 1. The current detector 204 measures operating current of the outdoor unit 100. The storage device 206 stores data (regarding a temperature detection value, a valve opening value, etc.) generated during operation of the air conditioner and software necessary to operate the air conditioner. The test run progress rate controller 208 checks a test run progress rate and provides information regarding the test run progress rate to the outdoor unit controller 202. The outdoor unit controller 202 transmits the information regarding the run progress rate to the indoor unit 150 such that the indoor unit 150 displays the progress rate. The compressor driving controller 210 controls operation of the compressor 102. The outdoor fan controller 212 controls operation (on/off) and rotational speed of the outdoor fan 106a. The four-way valve controller 214 controls opening/closing and an opening degree of the four-way valve 104. The electronic expansion valve controller 260 controls an opening degree of the electronic expansion valve 154 in response to a control command from the outdoor unit controller 202.

In the indoor unit 150, the indoor heat exchanger temperature detectors 156, the indoor temperature detector 158, an input device 254, an indoor fan controller 256, and a display device 258 are electrically connected to an indoor unit controller 252 in a communicable fashion. In addition, an indoor unit power supply device 264 to supply power to the indoor unit 150 is provided at the indoor unit 150. The indoor heat exchanger temperature detectors 156 and the indoor temperature detector 158 were previously described with reference to FIG. 1. The input device 254 allows a user or an engineer to generate a command to control the air conditioner. The input device 254 includes buttons and keys to generate a basic operation control command of the air conditioner. Particularly, the input device 254 includes a test run button 254a to generate a test run command. The indoor fan controller 256 controls operation (on/off) and rotational speed of the indoor fan 152a. The display device 258 displays an operation state of the air conditioner and a message or warning generated during operation of the air conditioner. The display device 258 is provided at the indoor unit 150. Particularly, the display device 258 displays a test run progress rate and a test run result such that a user (consumer) may directly recognize the test run result. In a case in which the indoor unit 150 is of a stand type, the display device 258 may be a liquid crystal display (LCD) panel. In a case in which the indoor unit 150 is of a wall-mount type, the display device 258 may be a light emitting device, such as a light emitting diode (LED) device. In addition, the display device 258 may include a speaker. In a case in which the display device 258 is an LCD panel, a test run progress state of diagnosis control up to now may be displayed as a percentage or the test run may be divided into 0 to 99 steps and each progress step may be displayed. In addition, a graph may be displayed or an inspection result may be expressed using a word, such as <normal> or <inspection>. The word <inspection> indicates that the air conditioner is operating abnormally and needs to be inspected. In a case in which the display device 258 is an LED device, a plurality of LEDs may be installed such that a test run progress degree is displayed based on the number of lit LEDs. In a case in which the display device 258 includes a speaker, a progress degree may be announced using a voice. In addition, a network module 262 to transmit and receive data to and from a remote server is included in the indoor unit.

Two-way communication is performed between the outdoor unit 100 and the indoor units 150 shown in FIGS. 1 and 2. Two-way communication is also performed between the indoor units 150. The outdoor unit 100 and the indoor units 150 may exchange various kinds of information generated during operation of the air conditioner through such two-way communication.

Figure 3A:
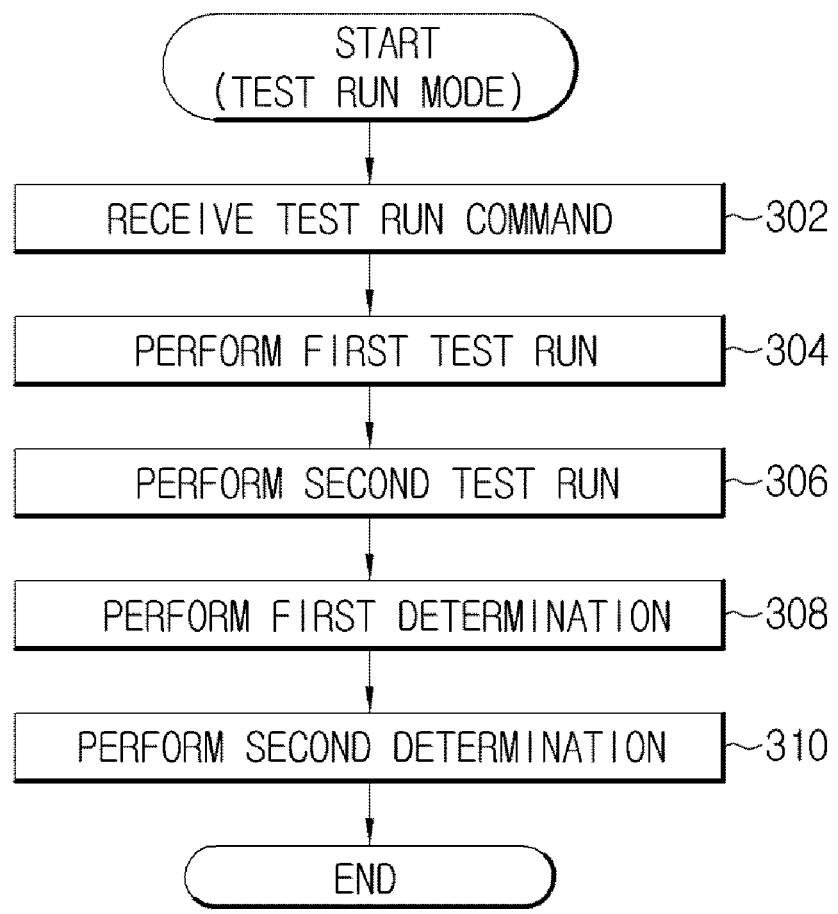
FIG. 3A is a view showing a diagnosis control method (test run mode) of an air conditioner according to an embodiment.
Figure 3B:
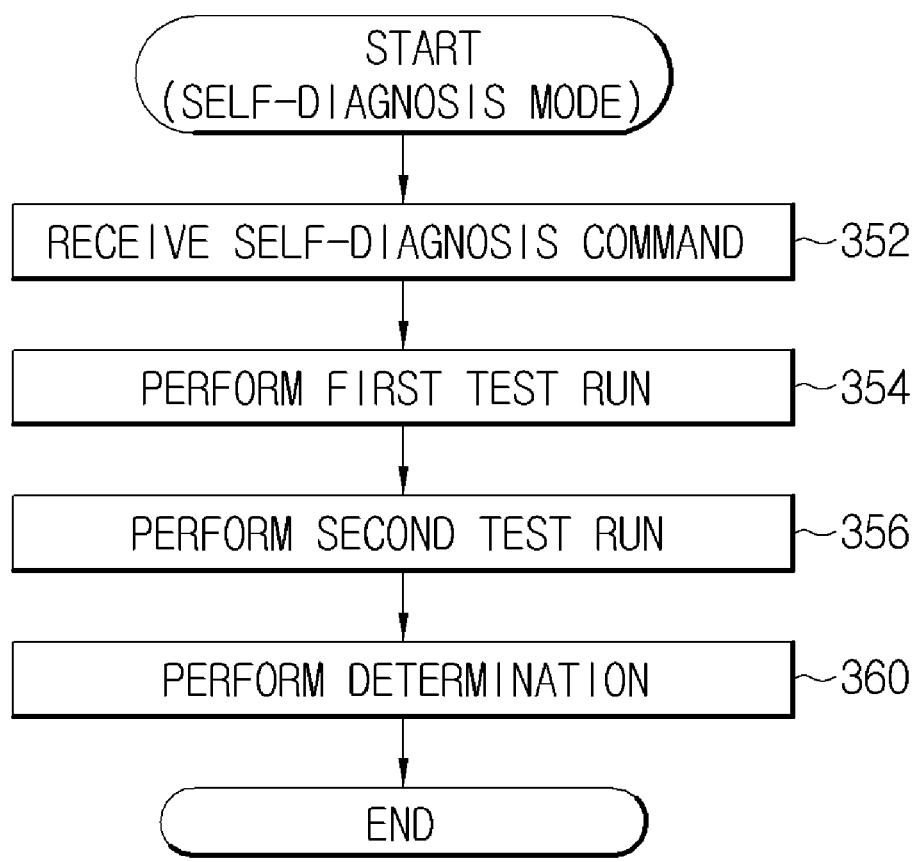
FIG. 3B is a view showing a diagnosis control method (self-diagnosis mode) of an air conditioner according to an embodiment.

FIG. 3A is a view showing a diagnosis control method (test run mode) of an air conditioner according to an embodiment. FIG. 3B is a view showing a diagnosis control method (self-diagnosis mode) of an air conditioner according to an embodiment. The test run mode of FIG. 3A may be used as a method of checking whether an air conditioner is normally installed when the air conditioner is installed for the first time or reinstalled after removal of the air conditioner. On the other hand, the self-diagnosis mode may be used as a method of a user (or a service engineer) directly checking whether an installed state of an air conditioner is normal during use of the air conditioner after installation of the air conditioner. Of course, the service engineer may use the self-diagnosis mode and the user may use the test run mode. The diagnosis control method shown in FIGS. 3A and 3B is performed under control of the outdoor unit controller 202 and the indoor unit controller 252 shown in FIG. 2.

In the test run mode of FIG. 3A, when a user (consumer) or an installation engineer manipulates the test run button 254a provided at the input device 254 of the indoor unit 150 to generate a test run command, the indoor unit controller 252 receives the test run command and transmits the test run command to the outdoor unit controller 202 (302). As a result, the indoor unit controller 252 and the outdoor unit controller 202 jointly recognize that the test run command has been generated.

The diagnosis control method (test run mode) of the air conditioner includes a first test run process 304, a second test run process 306, a first determination process 308, and a second determination process 310. In the first test run process 304, an assembly state and a driving state of various kinds of machinery and equipment and application components in the outdoor unit 100 and the indoor unit 150 are checked while the indoor fan 152a of the indoor unit 150 is operated. In the second test run process 306, it is checked whether refrigerant normally flows between the indoor unit 100 and each indoor unit 150 while the compressor 102 of the outdoor unit 100 is operated. In the first determination process 308, it is checked whether a high-pressure clogging error has occurred based on the operation results of the first test run process 304 and the second test run process 306. The high-pressure clogging error occurs when a constraint condition, such as valve locking or expansion valve locking, which disturbs refrigerant circulation, is met. In the second determination process 310, it is determined whether a necessary amount of refrigerant is normally supplied to each indoor unit 150. The second determination process 310 is a refrigerant shortage determination process to determine whether refrigerant is normally circulated without clogging and then to determine whether the amount of refrigerant supplied to each indoor unit 150 is sufficient. The first determination process 308 and the second determination process 310 may be combined into a single determination process.

The self-diagnosis mode of FIG. 3B, which is frequently used by a user during use of the air conditioner after the air conditioner is installed, is performed using an entry mode different from the test run mode. In addition, unlike the test run mode, the first determination process is omitted and only the second determination process is performed in the self-diagnosis mode. The self-diagnosis mode is an inspection mode performed by a user during use of the normally installed air conditioner. Based on the self-diagnosis result, <normal> or <inspection> may be displayed through the display device 258 of the indoor unit. Unlike the test run mode, switching to a locked state is not performed even when an error occurs. When a user (consumer) or an installation engineer manipulates a self-diagnosis button 254b provided at the input device 254 of the indoor unit 150 to generate a self-diagnosis command, the indoor unit controller 252 receives the self-diagnosis command and transmits the self-diagnosis command to the outdoor unit controller 202 (352). As a result, the indoor unit controller 252 and the outdoor unit controller 202 jointly recognize that the self-diagnosis command has been generated.

The diagnosis control method (self-diagnosis mode) of the air conditioner includes a first test run process 354, a second test run process 356, and a determination process 360. The first test run process 354 and the second test run process 356 are performed in the same manner as the first test run process 304 and the second test run process 306 of the test run mode. That is, in the first test run process 354, an assembly state and a driving state of various kinds of machinery and equipment and application components in the outdoor unit 100 and the indoor unit 150 are checked while the indoor fan 152a of the indoor unit 150 is operated. In the second test run process 356, it is checked whether a high-pressure clogging error has occurred and a refrigerant shortage error has occurred as previously described while the compressor 102 of the outdoor unit 100 is operated. In the determination process 360, however, it is determined whether a high-pressure clogging error has occurred and then whether a refrigerant shortage error has occurred without division into the first determination process and the second determination process.

Figure 4:
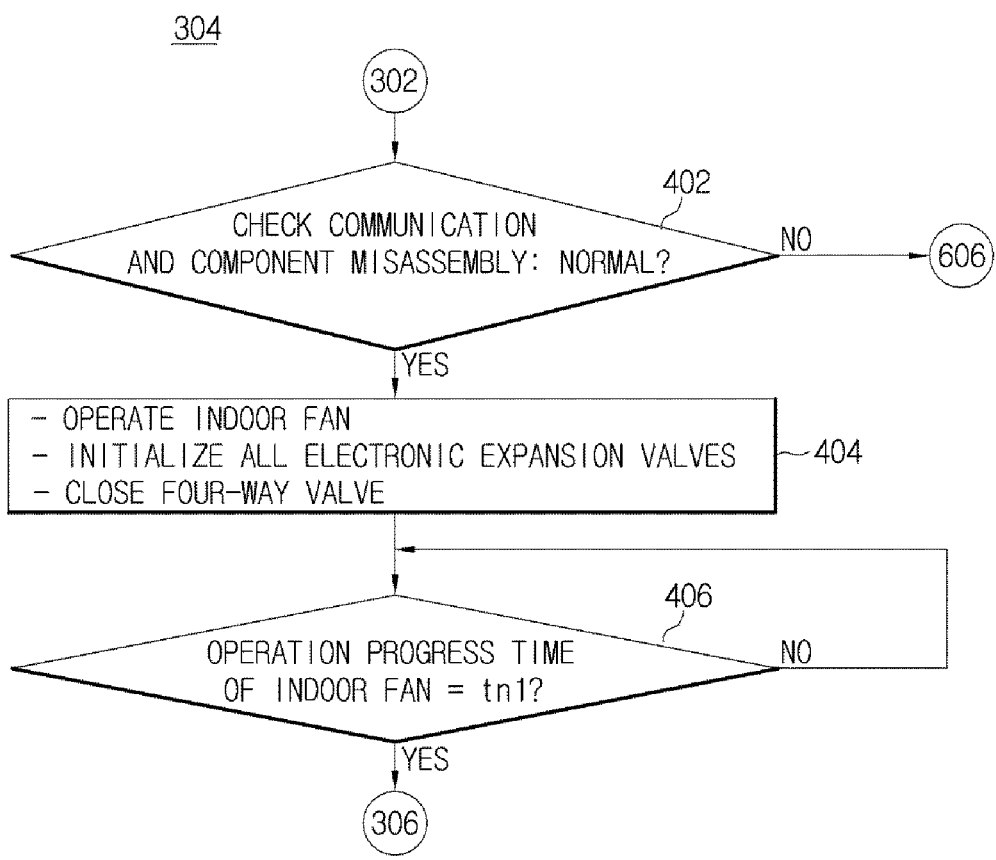
FIG. 4 is a flowchart showing a first test run process of the diagnosis control method shown in FIGS. 3A and 3B.

FIG. 4 is a flowchart showing the first test run process of the diagnosis control method shown in FIGS. 3A and 3B. As shown in FIG. 4, in the first test run process 304, a communication state between the outdoor unit 100 and the indoor unit 150 is checked and, when checking of the communication state is completed, a component misassembly state is checked while the indoor fan 152a is operated (402). Checking of the communication state is possible through checking of a response signal generated when the corresponding components are normally operated. Checking of the component misassembly state is also possible through checking of a response generated when the corresponding components are normally assembled. If both the communication state and the component assembly state are normal (YES of 402), the indoor fan 152a is operated to blow air into an air conditioning space in which the indoor unit 150 is installed (404). At this time, the electronic expansion valve of each indoor unit 150 is initialized and the four-way valve 104 of the outdoor unit 100 is closed. The indoor fan 152a is continuously operated until a predetermined time tn1 is reached (NO of 406). If an operation progress time of the indoor fan 152a reaches the predetermined time tn1, entry into the second test run process 304 is performed (YES of 406). Here, the indoor fan 152a is operated for the predetermined time tn1 in a state in which the compressor 102 is stopped because it is necessary to saturate the temperature detector (that is, the indoor heat exchanger temperature detectors 156 and the indoor temperature detector 158) of the indoor unit 150 to the temperature of the air conditioning space in order to prevent a determination error in a subsequent process. If both the communication state and the component assembly state are not normal in the process 402 of checking the communication state between the outdoor unit 100 and the indoor unit 150 and the component misassembly state (NO of 402), the procedure advances to 606 of the first determination process 308, which will hereinafter be described (see FIG. 6).

Figure 5:
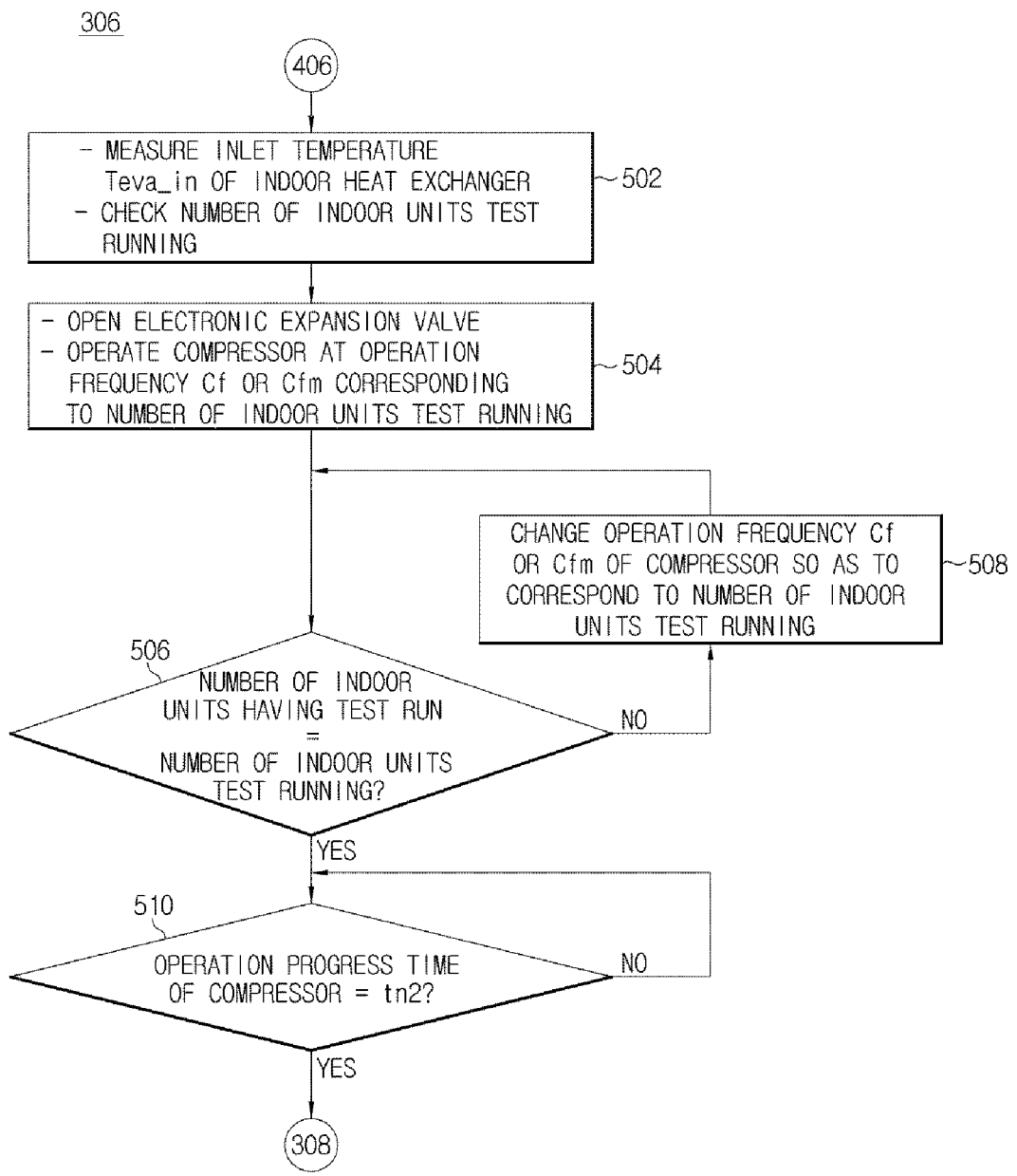
FIG. 5 is a flowchart showing a second test run process of the diagnosis control method shown in FIGS. 3A and 3B.

FIG. 5 is a flowchart showing the second test run process of the diagnosis control method shown in FIGS. 3A and 3B. As shown in FIG. 5, in the second test run process 306, an inlet temperature Teva_in of the indoor heat exchanger 152 is measured through the indoor heat exchanger temperature detectors 156 before the compressor 102 is operated and the number of indoor units 150 to be test run is checked (502). The number of indoor units 150 to be test run may be checked through communication with the indoor units 150 which are operated. It is assumed that the indoor units 150 include a stand type indoor unit and a wall-mount type indoor unit. If both the stand type indoor unit and the wall-mount type indoor unit are test running, the number of indoor units 150 test running is 2. If only the stand type indoor unit or the wall-mount type indoor unit is currently test running, the number of indoor units 150 test running is 1. Subsequently, the electronic expansion valve 154 of the indoor unit 150 is opened, and the compressor 102 is operated at an operation frequency Cf/Cfm corresponding to the number of indoor units 150 test running (504). The operation frequency Cf of the compressor 102 is an operation frequency of the compressor 102 when only one indoor unit 150 is test run. The operation frequency Cfm of the compressor 102 is an operation frequency of the compressor 102 when a plurality of indoor units 150 is test run. During operation of the compressor 102, it is compared whether the number of indoor units 150 test running is equal to the number of the indoor units 150 having test run (506). If the number of indoor units 150 test running is not equal to the number of the indoor units 150 having test run (NO of 506), the operation frequency Cf/Cfm of the compressor 102 is changed so as to correspond to the number of indoor units 150 test running (508). That is, if the number of indoor units 150 test running is greater than the number of the indoor units 150 having test run, the operation frequency Cf/Cfm of the compressor 102 is increased. On the other hand, if the number of indoor units 150 test running is less than the number of the indoor units 150 having test run, the operation frequency Cf/Cfm of the compressor 102 is decreased. The reason that the operation frequency of the compressor 102 is changed based on a single operation or multiple operations is that the operation frequency of the compressor 102 is changed based on the sum of operating capacity required by the indoor units 150 to improve reliability in diagnosis result of the air conditioner and discrimination in determination. If the number of indoor units 150 test running is equal to the number of the indoor units 150 having test run (YES of 506) in the process 506 of comparing whether the number of indoor units 150 test running is equal to the number of the indoor units 150 having test run, the compressor 102 is continuously operated without change of the operation frequency Cf/Cfm of the compressor 102. The compressor 102 is continuously operated until an operation progress time of the compressor 102 reaches a predetermined time tn2 (510). If the operation progress time of the compressor 102 reaches the predetermined time tn2 (YES of 510), entry into the first determination process 308 is performed. For reference, the electronic expansion valve 154 of the indoor units 150 test running remains open at a predetermined fixed opening degree during operation of the compressor 102 such that a predetermined amount of refrigerant is supplied to the indoor unit 150. Proper opening values of the electronic expansion valve 154 of the indoor units 150 test running are prestored in the storage device 206 such that proper opening degrees of the electronic expansion valve 154 necessary for diagnosis based on model of the air conditioner are maintained.

Figure 6A:
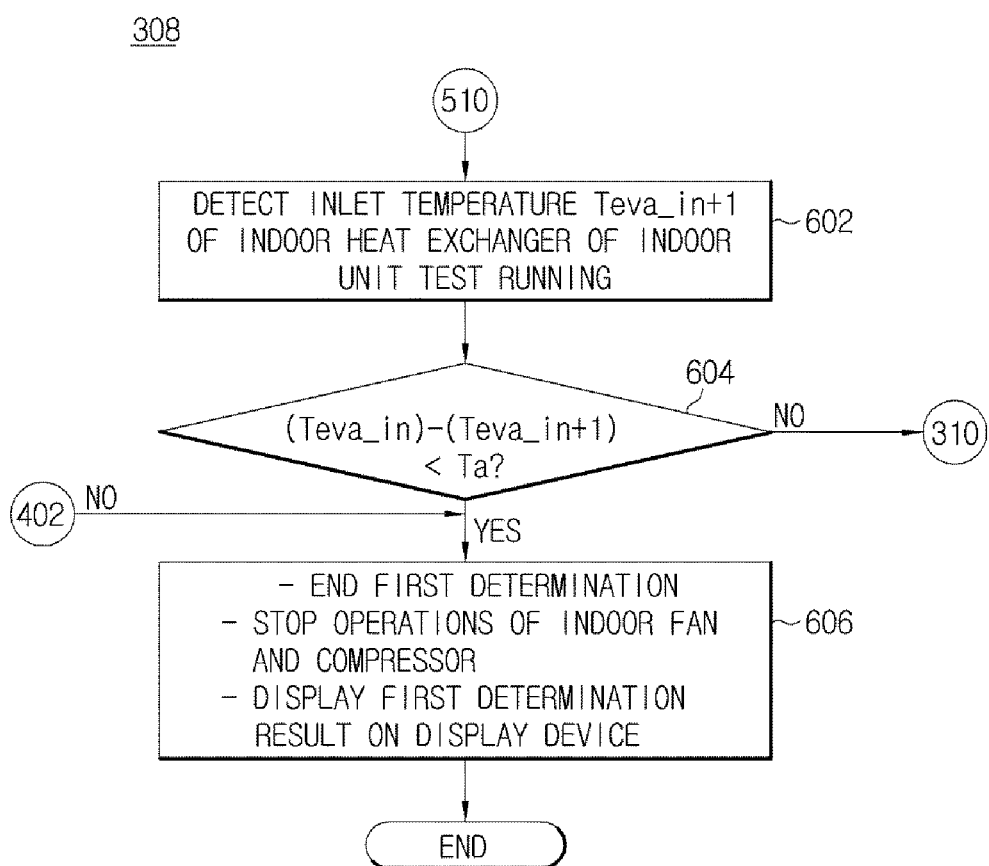
FIG. 6A is a flowchart showing an embodiment of a first determination process of the diagnosis control method (test run mode) shown in FIG. 3A.

FIG. 6A is a flowchart showing an embodiment of the first determination process of the diagnosis control method (test run mode) shown in FIG. 3A. As previously described with reference to FIG. 5, if the operation progress time of the compressor 102 reaches the predetermined time tn2 (YES of 510), entry into the first determination process 308 is performed. In the first determination process 308, an inlet temperature Teva_in+1 of the indoor heat exchanger of the indoor unit 150 test running is detected (602). Subsequently, a difference (Teva_in)−(Teva_in+1) between the inlet temperature Teva_in (see 502 of FIG. 5) of the indoor heat exchanger 152 detected before the compressor 102 is operated and the current inlet temperature Teva_in+1 (see 602) of the indoor heat exchanger is compared with a predetermined reference value Ta (604). If (Teva_in)−(Teva_in+1) is less than the reference value Ta (YES of 604), the operations of the indoor fan 152a and the compressor 102 are stopped and the first determination result is displayed as a pipe connection error on the display device 258 (606). (Teva_in)−(Teva_in+1) being equal to or greater than the reference value Ta indicates that the refrigerant is normally circulated to the indoor units 150 test running, which indicates that pipe connection between the outdoor unit 100 and the indoor units 150 test running is normal. Furthermore, this indicates that a refrigerant constraint condition is not met due to locking of service valve (not shown) or locking of the electronic expansion valve 154. That is, a high-pressure clogging error does not occur. On the other hand, (Teva_in)−(Teva_in+1) being less than the reference value Ta indicates that refrigerant is not normally circulated due to mispiping between the outdoor unit 100 and the indoor unit 150. For reference, even in a case in which both the communication state and the component assembly state are not normal (YES of 402) in the process 402 of checking the communication state between the outdoor unit 100 and the indoor unit 150 and the component misassembly state as previously described with reference to FIG. 4, a corresponding error is displayed through the display device 258 in the process 606 of FIG. 6. If (Teva_in)−(Teva_in+1) is equal to or greater than the reference value Ta (YES of 604), it is determined that a high-pressure clogging error has not occurred and entry into the second determination process 310 is performed.

FIG. 6B is a flowchart showing another embodiment of the first determination process of the diagnosis control method (test run mode) shown in FIG. 3A. In the first determination process shown in FIG. 6B, a state in which refrigerant is not circulated to each indoor unit 150 due to two conditions, such as clogging of the air conditioner and complete leakage of the refrigerant, is detected. If the compressor 102 is continuously operated in a state in which the refrigerant is not circulated in the air conditioner, the compressor 102 may be seriously damaged, for example burned out. For this reason, if an operation state corresponding to high-pressure clogging is detected in the test run mode, the operation of the air conditioner is stopped and a corresponding error is displayed. As shown in FIG. 6B, an indoor air temperature Tair_in is detected (652). The compressor 102 is continuously operated until an operation time of the compressor 102 reaches a predetermined compressor operation reference time tn (654). If the operation time of the compressor 102 reaches the compressor operation reference time tn (YES of 654), it is checked whether the compressor frequency Cf is equal to or greater than a compressor target frequency Cf2 (656). If the compressor frequency Cf is greater than the compressor target frequency Cf2 (YES of 656), an inlet temperature Teva_in and an outlet temperature Teva_out of the indoor heat exchanger are detected (658). If a difference (Tair_in)−(Teva_in) between the indoor air temperature Tair_in and the inlet temperature Teva_in of the indoor heat exchanger is equal to or less than a predetermined reference value Ka and a difference (Tair_in)−(Teva_out) between the indoor air temperature Tair_in and the outlet temperature Teva_out of the indoor heat exchanger is equal to or less than another predetermined reference value Kb (YES of 660), it is determined that the corresponding electronic expansion valve of the outdoor unit 100 is clogged or the refrigerant has completely leaked, the operation of the compressor 102 is stopped (662), and a corresponding error is displayed through the display device 258 (664). On the other hand, if the difference (Tair_in)−(Teva_in) between the indoor air temperature Tair_in and the inlet temperature Teva_in of the indoor heat exchanger is greater than the predetermined reference value Ka and the difference (Tair_in)−(Teva_out) between the indoor air temperature Tair_in and the outlet temperature Teva_out of the indoor heat exchanger is greater than the predetermined reference value Kb (NO of 660), it is determined that high-pressure clogging has not occurred and entry into the second determination process 310 to determine an amount of the refrigerant is performed.

Figure 7:
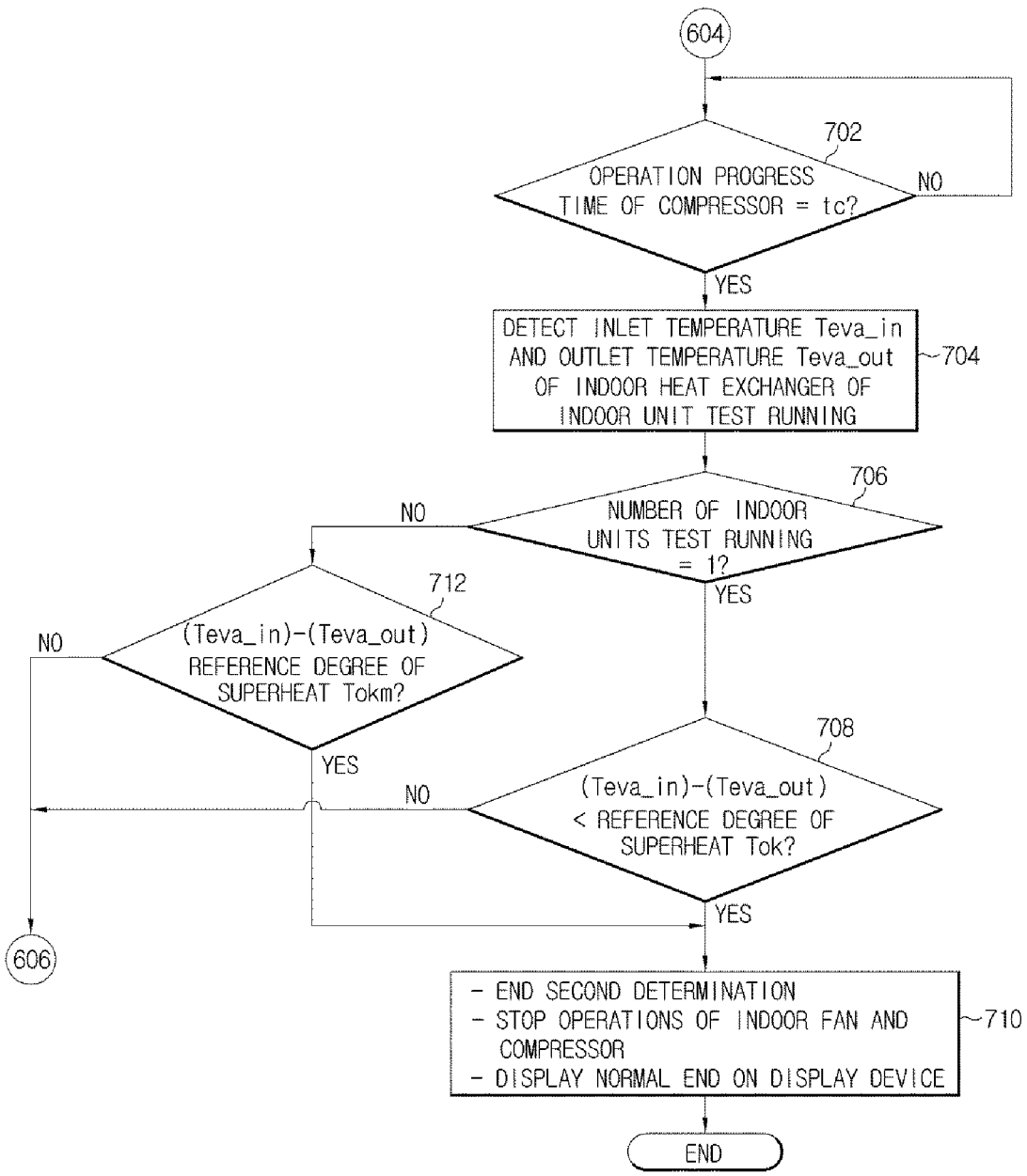
FIG. 7 is a flowchart showing an embodiment of a second determination process of the diagnosis control method (test run mode) shown in FIG. 3A.

FIG. 7 is a flowchart showing an embodiment of the second determination process of the diagnosis control method shown in FIG. 3A. The second determination process shown in FIG. 7 is performed if (Teva_in)−(Teva_in+1) is equal to or greater than the reference value Ta (NO of 604) in the first determination process 308 of FIG. 6. First, if (Teva_in)−(Teva_in+1) is equal to or greater than the reference value Ta and the operation time of the compressor 102 is a predetermined time tc (for example, 5 minutes) (YES of 702), the inlet temperature Teva_in and the outlet temperature Teva_out of the indoor heat exchanger of the indoor unit 150 test running are detected (704).

If the number of the indoor units 150 test running is 1 (YES of 706) and a difference (Teva_out)−(Teva_in) between the inlet temperature Teva_in and the outlet temperature Teva_out of the indoor heat exchanger of the corresponding indoor unit 150 is less than a reference degree of superheat Tok (YES of 708), the second determination is ended, the operations of the indoor fan 152a and the compressor 102 are stopped, and the second determination result is displayed as <normal> on the display device 258 (710).

If the number of the indoor units 150 test running is plural (NO of 706) in the process 706 and the difference (Teva_out)−(Teva_in) between the inlet temperature Teva_in and the outlet temperature Teva_out of the indoor heat exchanger of each indoor unit 150 is less than another reference degree of superheat Tokm (YES of 712), the second determination is ended, the operations of the indoor fan 152a and the compressor 102 are stopped, and the second determination result is displayed as <normal> on the display device 258 (710). If the difference (Teva_out)−(Teva_in) between the inlet temperature Teva_in and the outlet temperature Teva_out of the indoor heat exchanger is equal to or greater than the reference degree of superheat Tok or Tokm (NO of 708 and 712) in the processes 708 and 712, the procedure advances to the process 606 of displaying the first determination result in the previously described process 6060 to display a refrigerant shortage error through the display device 258. If the amount of refrigerant circulated in a refrigeration cycle of the air conditioner is insufficient, a gaseous phase rate of refrigerant passing through the indoor heat exchanger 152 is increased due to the characteristics of the indoor heat exchanger 152 in which phase transition of the refrigerant is performed from a liquid phase to a gaseous phase with the result that the outlet temperature Teva_out of the indoor heat exchanger is increased. In addition, the flow rate of a liquid refrigerant introduced into the inlet of the indoor heat exchanger 152 is decreased with the result that pressure is lowered and temperature is also decreased. Consequently, the inlet temperature Teva_in of the indoor heat exchanger is decreased and the outlet temperature Teva_out of the indoor heat exchanger is increased. As a result, the degree of superheat is greater than a normal level. For this reason, if the difference (Teva_out)−(Teva_in) between the inlet temperature Teva_in and the outlet temperature Teva_out of the indoor heat exchanger is equal to or greater than the reference degree of superheat Tok or Tokm (NO of 708 and 712), it is determined that the amount of the refrigerant is insufficient. In a case in which the indoor unit 150 is of a wall-mount type, only the degree of superheat Tok is applied.

In addition, in a case in which test run of the air conditioner has not been performed, a locked state of the air conditioner may not be released such that the operation of the air conditioner is restricted. In addition, if an error occurs during test run of the air conditioner, the test run may be resumed. If the test run of the air conditioner is not normally completed, a locked state of the air conditioner may not be released such that the use of the air conditioner is restricted.

Figure 8:
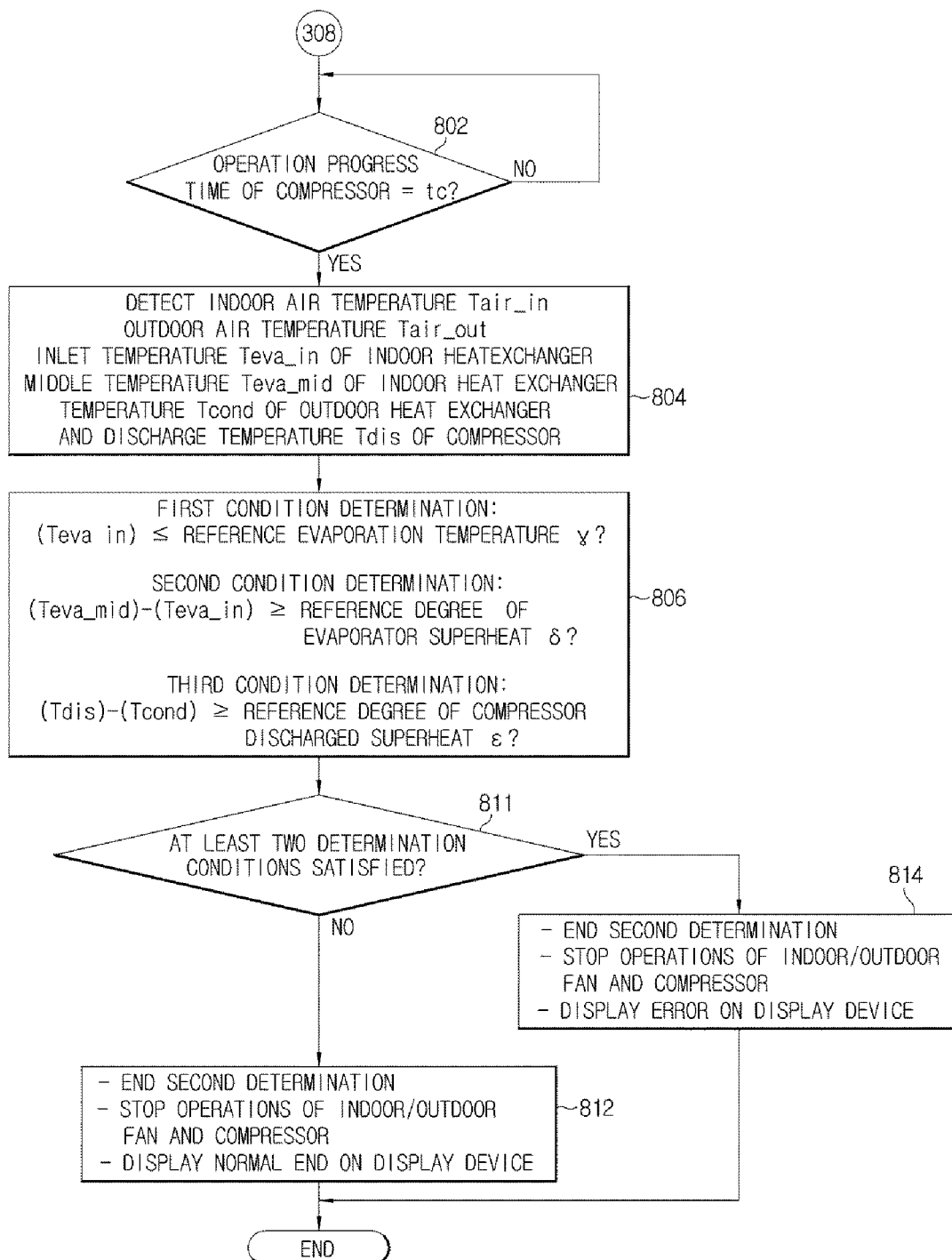
FIG. 8 is a flowchart showing an embodiment of the second determination process of the diagnosis control method (test run mode) shown in FIG. 3A.

FIG. 8 is a flowchart showing another embodiment of the second determination process of the diagnosis control method (test run mode) shown in FIG. 3A. The second determination process shown in FIG. 8 may be applied in a case in which only the inlet temperature and the middle temperature of the indoor heat exchanger 152 are detected or only the inlet temperature of the indoor heat exchanger 152 is detected. In the second determination process shown in FIG. 8, three determination conditions are applied. If two or more of the determination conditions are satisfied, it is determined that the amount of refrigerant is insufficient.

As shown in FIG. 8, the compressor 102 is operated for a predetermined time tc (for example, 5 minutes) or more. If the operation time of the compressor 102 reaches tc (YES of 802), the following temperatures are detected (804).

Indoor air temperature Tair_in
Outdoor air temperature Tair_out
Inlet temperature Teva_in of indoor heat exchanger
Middle temperature Teva_mid of indoor heat exchanger
Temperature Tcond of outdoor heat exchanger
Discharge temperature Tdis of compressor If the above temperatures are detected, first, second, and third conditions are determined for first error determination (806). First, for the first condition determination, it is checked whether the inlet temperature Teva_in of the indoor heat exchanger is equal to or less than a predetermined reference evaporation temperature γ. The reference evaporation temperature γ is a value defined by γ=(Tair_out−35)× 0.01×C1+(Tair_in−27)×0.01×C2+C3 (C1, C2, and C3 being constants decided based on characteristics of the air conditioner). The first determination condition is used to measure the inlet temperature Teva_in of the indoor heat exchanger to determine whether a refrigerant level is insufficient, uses a principle in which the inlet temperature of the indoor heat exchanger is decreased if the refrigerant is insufficient. After the compressor 102 is started, the inlet temperature Teva_in of the indoor heat exchanger is measured. If the inlet temperature Teva_in of the indoor heat exchanger is equal to or less than a predetermined value, it is determined that the amount of the refrigerant is insufficient. The predetermined value is changed based on the indoor air temperature Tair_in and the outdoor air temperature Tair_out.

Subsequently, for the second condition determination, it is determined whether refrigerant is insufficient based on a difference (Teva_mid)−(Teva_in) between the middle temperature Teva_mid of the indoor heat exchanger and the inlet temperature Teva_in of the indoor heat exchanger. That is, it is checked whether the difference (Teva_mid)−(Teva_in) between the middle temperature Teva_mid of the indoor heat exchanger and the inlet temperature Teva_in of the indoor heat exchanger is equal to or greater than a predetermined reference degree of evaporator superheat δ. In the second determination condition, if the difference (Teva_mid)−(Teva_in) between the middle temperature Teva_mid of the indoor heat exchanger and the inlet temperature Teva_in of the indoor heat exchanger is greater than the reference degree of evaporator superheat δ, it is determined that the amount of refrigerant circulated in the indoor unit 150 is insufficient. If the amount of refrigerant circulated in the refrigeration cycle of the air conditioner is insufficient, a gaseous phase rate of refrigerant passing through the indoor heat exchanger 152 is increased due to the characteristics of the indoor heat exchanger 152 in which phase transition of the refrigerant is performed from a liquid phase to a gaseous phase with the result that the outlet temperature Teva_out of the indoor heat exchanger is increased. In addition, the flow rate of a liquid refrigerant introduced into the inlet of the indoor heat exchanger 152 is decreased with the result that pressure is lowered and the inlet temperature Teva_in of the indoor heat exchanger is also decreased. Consequently, the inlet temperature Teva_in of the indoor heat exchanger is decreased and the outlet temperature Teva_out of the indoor heat exchanger is increased. As a result, the degree of superheat is greater than a normal level. Even in a case in which the temperature detector is not attached to the outlet but to the middle portion of the indoor heat exchanger 152, the difference between the middle temperature Teva_mid of the indoor heat exchanger and the inlet temperature Teva_in of the indoor heat exchanger is greater than a normal level when the refrigerant level is insufficient. For this reason, it is determined whether the refrigerant level is insufficient using the middle temperature Teva_mid of the indoor heat exchanger instead of the outlet temperature Teva_out of the indoor heat exchanger Subsequently, for the third condition determination, it is determined whether a refrigerant level is insufficient based on a difference (Tdis)–(Tcond) between the discharge temperature Tdis of the compressor and the outlet temperature Tcond of the outdoor heat exchanger. That is, it is checked whether the difference (Tdis)–(Tcond) between the discharge temperature Tdis of the compressor and the outlet temperature Tcond of the outdoor heat exchanger is equal to or greater than a predetermined degree of discharged superheat $\varepsilon$. If the compressor is operated in a state in which the refrigerant level is insufficient, the discharge temperature Tdis of the compressor is increased with the result that the difference (Tdis)–(Tcond) between the discharge temperature Tdis of the compressor and the outlet temperature Tcond of the outdoor heat exchanger is greater than a normal level, which is used in the third determination condition.

If it is determined that at least two of the first, second, and third determination conditions are satisfied (YES of 811), the operations of the indoor fan 152a and the compressor 102 are stopped and the second determination result is displayed as a refrigerant shortage error on the display device 258 (814). On the other hand, if it is determined that at least two of the first, second, and third determination conditions are not satisfied (NO of 811), it is determined that the refrigerant level is sufficient, the operations of the indoor fan 152a, the outdoor fan 106a, and the compressor 102 are stopped, and <normal> is displayed on the display device 258 (812).

In FIG. 8, the first determination condition, the second determination condition, and the third determination condition are performed as one process. Alternatively, determination of the first determination condition, the second determination condition, and the third determination condition may be partially omitted or the sequence of the first determination condition, the second determination condition, and the third determination condition may be changed based on the following conditions. For example, in the first condition determination process, if the inlet temperature Teva_in of the indoor heat exchanger is equal to or less than the reference evaporation temperature $\gamma$ it may be determined that the refrigerant level is insufficient and the third condition determination may be performed. In the first condition determination process, on the other hand, if the inlet temperature Teva_in of the indoor heat exchanger is greater than the reference evaporation temperature $\gamma$, the second condition determination may be performed.

In the second condition determination process, if the difference (Teva_mid)–(Teva_in) between the middle temperature Teva_mid of the indoor heat exchanger and the inlet temperature Teva_in of the indoor heat exchanger is equal to or greater than the reference degree of evaporator superheat $\delta$, the third condition determination may be performed. In the second condition determination process, on the other hand, If the difference (Teva_mid)–(Teva_in) between the middle temperature Teva_mid of the indoor heat exchanger and the inlet temperature Teva_in of the indoor heat exchanger is less than the reference degree of evaporator superheat $\delta$ it may be determined that the refrigerant level is sufficient, the operations of the indoor fan 152a, the outdoor fan 106a, and the compressor 102 may be stopped, and <normal> may be displayed on the display device 258 (812).

In the third condition determination process, if the difference (Tdis)–(Tcond) between the discharge temperature Tdis of the compressor and the outlet temperature Tcond of the outdoor heat exchanger is less than the degree of discharged superheat $\varepsilon$, it may be determined that the refrigerant level is sufficient, the operations of the indoor fan 152a, the outdoor fan 106a, and the compressor 102 may be stopped, and <normal> may be displayed on the display device 258 (812). In the third condition determination process, on the other hand, if the difference (Tdis)–(Tcond) between the discharge temperature Tdis of the compressor and the outlet temperature Tcond of the outdoor heat exchanger is equal to or greater than the degree of discharged superheat $\varepsilon$, the operations of the indoor fan 152a and the compressor 102 may be stopped and the second determination result may be displayed as a refrigerant shortage error on the display device 258 (814).

As is apparent from the above description, in an aspect of embodiments, a diagnosis control method of an air conditioner may clearly inform a user or an installation engineer of an installation error which may occur during installation of the air conditioner through diagnosis based on test run such that the user or the installation engineer installs the air conditioner and takes follow-up measures with objectivity and accuracy, thereby improving installation quality and completeness during installation of the air conditioner and thus improving customer satisfaction.

In addition, a user or a service engineer may determine whether the amount of refrigerant is sufficient using a self-diagnosis mode after the test run is normally completed during installation of the air conditioner, thereby performing inspection of the air conditioner during use of the air conditioner.

In addition, setting/installation information of the air conditioner may be transmitted to a specific remote server using a network (for example, a W-Fi network) through a network module and stored in a database after the test run mode or the self-diagnosis mode is completed, thereby achieving construction of a network between the air conditioner and the server.

In addition, if an error occurs during execution of the test run mode or the self-diagnosis mode, a service engineer may check a serial number (S/N) of the air conditioner using a mobile terminal, such as a smartphone and, correspondingly, the air conditioner may inform the service engineer of a method of resolving a corresponding test run error and information (database code, 3D image, etc.) of a corresponding defective component to provide the service engineer with guidelines to resolve the error and enable the service engineer to order a component to be replaced.

In a case in which a problem is encountered during use of the air conditioner, a user may transmit corresponding operation information of the air conditioner to a server and a mobile terminal of the user. When a service call is made, a service engineer may visit the user after previously having thorough knowledge of an operation state and information of the air conditioner. In a case in which a defective component is to be replaced, therefore, the service engineer may prepare a substitute, thereby preventing additional visit and thus reducing service expenses and improving customer satisfaction.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
    an indoor unit including an indoor fan and an indoor heat exchanger;
    an outdoor unit configured to be connected to the indoor unit by at least one refrigerant pipe, and including a compressor; and
    a controller configured to
        receive a test run command to perform a test run including a first test run and a second test run,
        control the air conditioner to perform the first test run by operating the indoor fan of the indoor unit when the indoor unit is connected to the outdoor unit by the at least one refrigerant pipe,
        control the air conditioner to perform the second test run by operating the compressor of the outdoor unit, and
        diagnose whether a valve of the air conditioner is clogged based on a first inlet temperature of the indoor heat exchanger before the compressor is operated in the second test run and a second inlet temperature of the indoor heat exchanger after the compressor is operated in the second test run.

2. The air conditioner according to claim 1, wherein the controller is further configured to provide at least one value, based on the at least one of the result of the first test run and the result of the second test run, which is used to determine whether or not a service valve of the air conditioner is locked.

3. The air conditioner according to claim 1, wherein the controller is configured to determine whether or not a service valve of the air conditioner is locked based on the at least one of the result of the first test run and the result of the second test run.

4. The air conditioner according to claim 1, wherein the controller is further configured to provide at least one value, based on the at least one of the result of the first test run and the result of the second test run, which is used to determine whether or not an amount of refrigerant in the air conditioner is insufficient.

5. The air conditioner according to claim 1, wherein the controller is further configured to determine whether an amount of refrigerant in the air conditioner is insufficient based on the at least one of the result of the first test run and the result of the second test run.

6. The air conditioner according to claim 1, wherein the controller is further configured to provide a signal, based on the result of the first test run, which is used to diagnose an assembly state of the air conditioner.

7. The air conditioner according to claim 1, wherein the controller is further configured to diagnose a communication state between the indoor unit and the outdoor unit while performing the test run.

8. The air conditioner according to claim 1, wherein the controller is further configured to prevent a locked state of the air conditioner from being released until the first test run and the second test run are completed.

9. The air conditioner according to claim 1, further comprising:
    an input interface configured to receive an input and transmit the test run command to the controller.

10. The air conditioner according to claim 1, wherein the controller is further configured to diagnose whether the valve of the air conditioner is clogged when a difference between the first inlet temperature of the indoor heat exchanger before the compressor is operated in the second test run and the second inlet temperature of the indoor heat exchanger after the compressor is operated in the second test run is less than a predetermined reference value.

11. The air conditioner according to claim 1, wherein the valve of the air conditioner includes at least one of a service valve and an expansion valve.

12. A diagnosis control method of an air conditioner including an indoor unit including an indoor fan and an indoor heat exchanger, and an outdoor unit including a compressor, the method comprising:
    receiving, by a controller of the air conditioner, a test run command, to perform a test run including a first test run and a second test run, after the indoor unit is connected to the outdoor unit by at least one refrigerant pipe;
    controlling, by the controller of the air conditioner, the indoor unit to perform the first test run by operating the indoor fan of the indoor unit;
    controlling, by the controller of the air conditioner, the outdoor unit to perform the second test run by operating the compressor of the outdoor unit; and
    diagnosing, by the controller of the air conditioner, whether a valve of the air conditioner is clogged based on a first inlet temperature of the indoor heat exchanger before the compressor is operated in the second test run and a second inlet temperature of the indoor heat exchanger after the compressor is operated in the second test run.

13. The method according to claim 12, wherein the diagnosing comprises:
    providing at least one value, based on at least one of the result of the first test run and the result of the second test run, which is used to determine whether or not a service valve of the air conditioner is locked.

14. The method according to claim 12, wherein the diagnosing comprises:
    determining, by the controller of the air conditioner, whether or not a service valve of the air conditioner is locked based on at least one of the result of the first test run and the result of the second test run.

15. The method according to claim 12, wherein the diagnosing comprises:
    providing at least one value, based on the at least one of the result of the first test run and the result of the second test run, which is used to determine whether an amount of a refrigerant of the air conditioner is insufficient.

16. The method according to claim 12, wherein the diagnosing comprises:
    determining, by the controller of the air conditioner, whether an amount of a refrigerant of the air conditioner is insufficient based on the at least one of the result of the first test run and the result of the second test run.

17. The method according to claim 12, further comprising:
   providing a signal, based on the result of the first test run, which is used to diagnose an assembly state of the air conditioner.

18. The method according to claim 12, further comprising:
   diagnosing, by the controller of the air conditioner, a communication state between the indoor unit and the outdoor unit while performing the test run.

19. The method according to claim 12, further comprising:
   preventing, by the controller of the air conditioner, a locked state of the air conditioner from being released until the first test run and the second test run are completed.

* * * * *